(12) United States Patent
Stallbaumer

(10) Patent No.: US 6,758,482 B2
(45) Date of Patent: Jul. 6, 2004

(54) MULTIPURPOSE STORAGE AND TRANSPORT CART

(75) Inventor: John J. Stallbaumer, Valley Center, KS (US)

(73) Assignee: Harper Trucks, Inc., Wichita, KS (US)

( * ) Notice: Subject to any disclaimer, the term of this patent is extended or adjusted under 35 U.S.C. 154(b) by 8 days.

(21) Appl. No.: 10/107,501

(22) Filed: Mar. 27, 2002

(65) Prior Publication Data

US 2003/0062700 A1 Apr. 3, 2003

Related U.S. Application Data

(60) Provisional application No. 60/326,180, filed on Oct. 1, 2001.

(51) Int. Cl.$^7$ ................................................. B62B 3/02
(52) U.S. Cl. ............................... 280/47.27; 280/47.18; 280/79.6; 280/47.36
(58) Field of Search ............................ 280/47.27, 43.1, 280/43.11, 47.131, 47.15, 47.17, 47.18, 47.2, 47.21, 47.23, 47.24, 47.26, 79.3, 79.5, 79.6, 47.315, 47.36, 47.371, 659

(56) References Cited

U.S. PATENT DOCUMENTS

| | | | | |
|---|---|---|---|---|
| 4,341,393 A | * | 7/1982 | Gordon et al. | 280/47.26 |
| 4,921,270 A | * | 5/1990 | Schoberg | 280/655.1 |
| 5,749,588 A | * | 5/1998 | Stallbaumer | 280/47.27 |
| 395,105 A | | 6/1998 | Stallbaumer | |
| 6,131,927 A | * | 10/2000 | Krawczyk | 280/47.29 |
| 6,193,247 B1 | * | 2/2001 | Spear et al. | 280/33.998 |
| 6,302,414 B1 | * | 10/2001 | Berthiaume et al. | 280/47.18 |
| 6,328,319 B1 | * | 12/2001 | Stahler, Sr. | 280/47.18 |
| 6,364,328 B1 | * | 4/2002 | Stahler, Sr. | 280/47.18 |
| 6,419,244 B2 | * | 7/2002 | Meabon | 280/47.27 |
| 6,588,775 B2 | * | 7/2003 | Malone, Jr. | 280/47.18 |
| 2001/0045718 A1 | * | 11/2001 | Boirum | 280/47.26 |

FOREIGN PATENT DOCUMENTS

DE             3534177 A1 * 4/1986             B62B/1/12

* cited by examiner

*Primary Examiner*—Brian L. Johnson
*Assistant Examiner*—J. Allen Shriver
(74) *Attorney, Agent, or Firm*—Husch & Eppenberger, LLC; Robert E. Muir

(57) ABSTRACT

A multipurpose cart having a hand truck base with a nose extension, a tub, a handle wherein the handle is adjustably mounted in two positions 90 degrees apart, a shelf, caster wheels and a storage device. The multipurpose cart can be modified into various configurations for a variety of functions.

21 Claims, 12 Drawing Sheets

MULTIPURPOSE STORAGE AND TRANSPORT CART

APPLICATION CROSS-REFERENCE

This application claims priority of prior Provisional Application No. 60/326,180, filed Oct. 1, 2001.

TECHNICAL FIELD OF THE INVENTION

This invention relates generally to a hand truck and more particularly to a multipurpose storage and transport cart.

DESCRIPTION OF THE RELATED ART

Hand trucks, storage devices, wheel barrows, wagons, utility cars, garden carts, work stations, mechanics carts, tool carts and bag holders (hereinafter collectively "utility devices") are useful and beneficial to most people in their day to day activities. In addition, nursery and construction businesses often use these utility devices. A down-side to the use of such devices is that the purchase of all of these utility devices is not practical or economical. For example, the average homeowner will likely use these devices from time to time, but not frequently enough to justify the purchase of each of these utility devices.

The shipping and storage of these utility devices is also problematic because they are bulky and large items. The costs associated with shipping each of these utility devices are significant, and the purchase of all of these utility devices would require the shipping of a significant number of packages. Also, the typical homeowner would be unable to store all of these utility devices in an efficient and aesthetically pleasing manner, due to the considerable space required to do so.

The present invention is directed to overcoming one or more of the problems or disadvantages set forth above.

SUMMARY OF THE INVENTION

An aspect of the present invention is to provide an apparatus for overcoming one or more of the problems and disadvantages set forth above.

It is an aspect of this invention to provide an apparatus that is adjustable into various configurations for performing various functions.

Another aspect of this invention is to provide an apparatus for reducing shipping costs and storage requirements generally associated with the purchase and ownership of the utility devices described above.

In another aspect of the invention, there is provided an apparatus that breaks down into a tub for shipping and storage.

In yet another aspect of the invention, there is provided a multipurpose apparatus for performing multiple functions.

These, and other objects and advantages of the present invention, will become apparent as the invention becomes better understood from the Detailed Description and the accompanying drawings.

BRIEF DESCRIPTION OF THE DRAWINGS

Reference is now made to the drawings, which illustrate the best known mode for carrying out the invention, and wherein similar reference characters indicate the same parts throughout the several views.

DETAILED DESCRIPTION

U.S. Pat. No. 5,749,588 and U.S. Design Pat. No. 395,105 describe and depict a hand truck that is a base portion of this invention and are hereby incorporated by reference. Differences, modifications and additions are explained herein.

Figure 1:
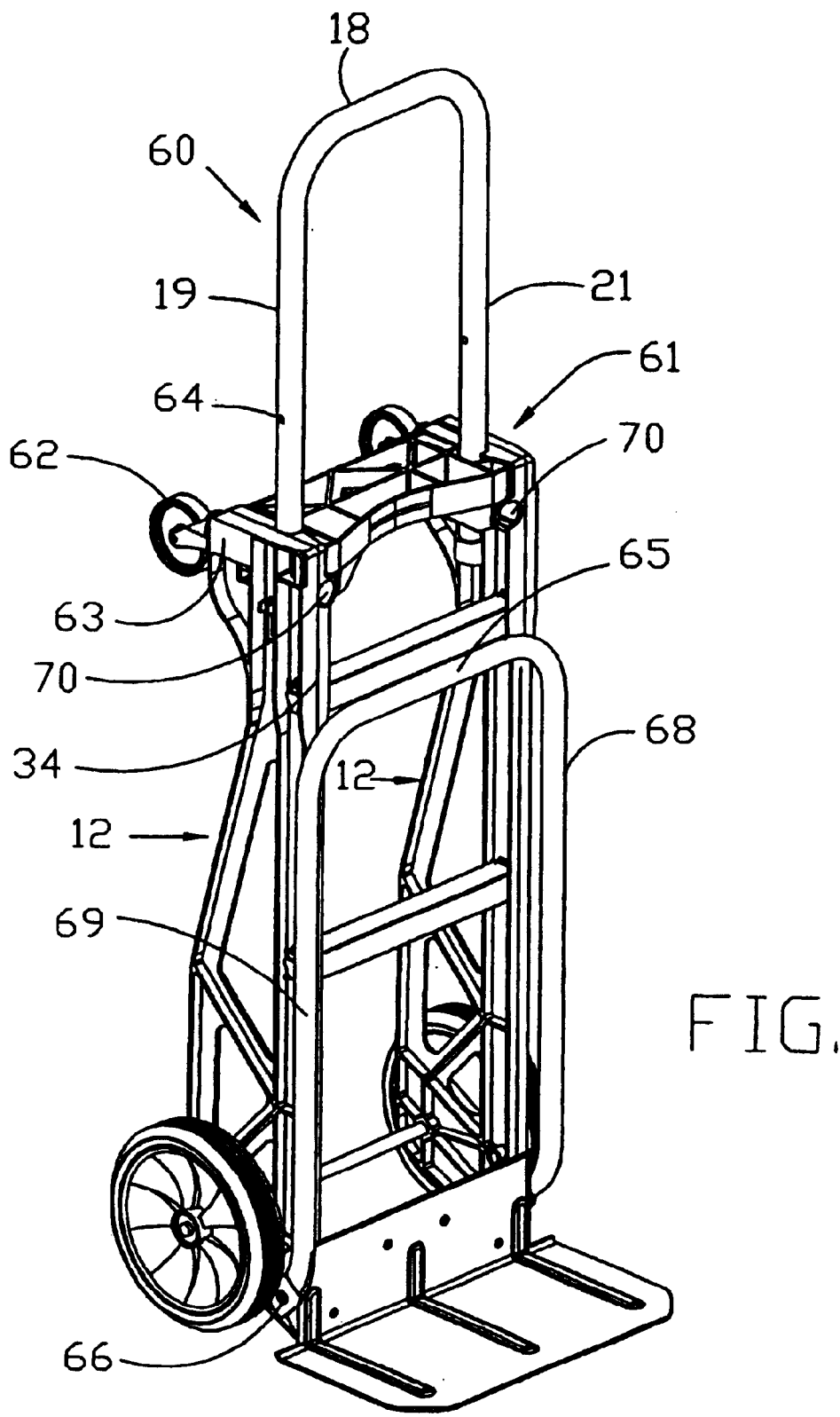
FIG. 1 is a perspective view of a multipurpose cart assembled in a hand truck configuration.
Figure 2:
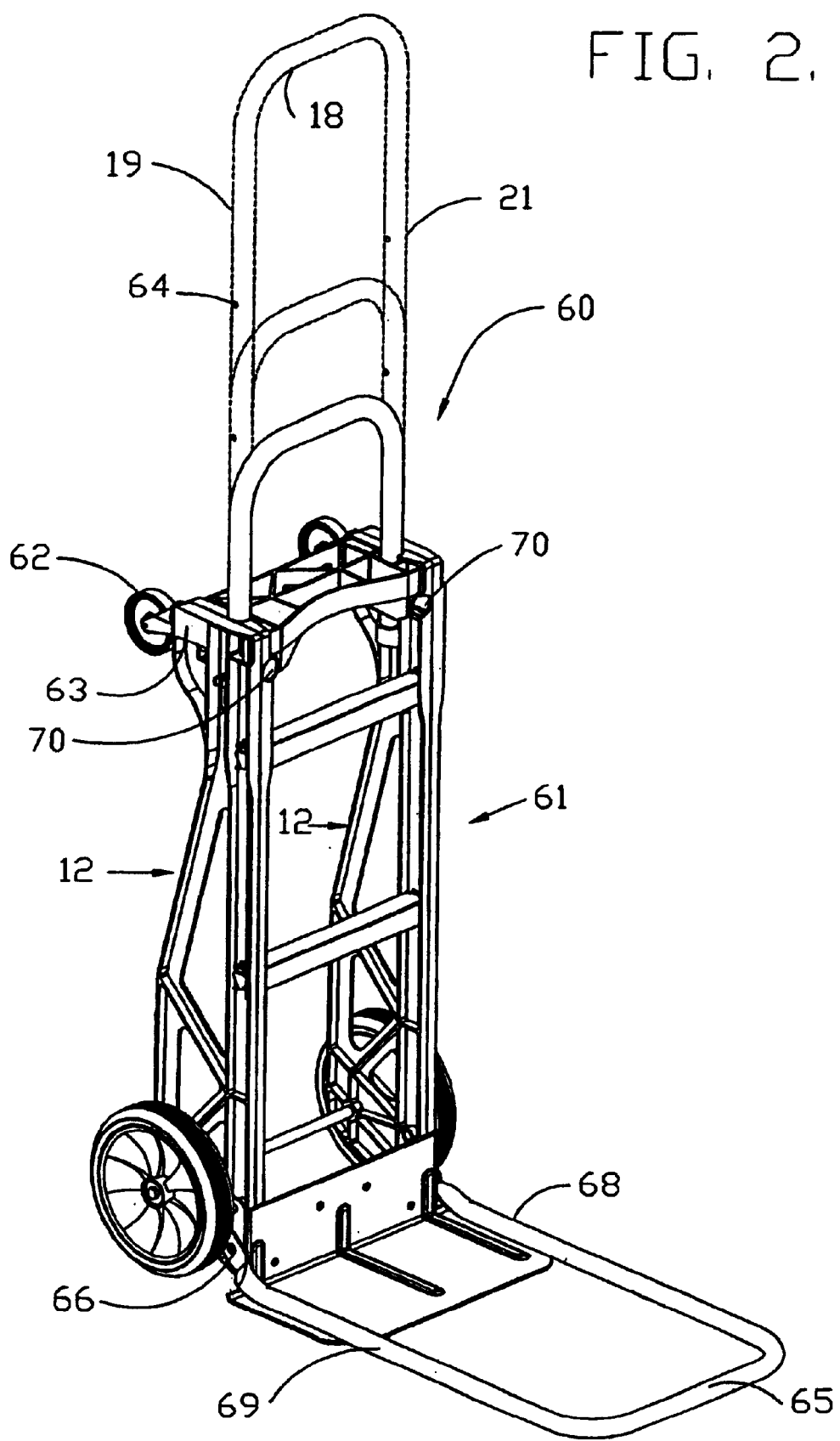
FIG. 2 is a perspective view of the multipurpose cart assembled in the hand truck configuration according to FIG. 1, showing the adjustability of the handle and having the nose extension in a horizontal or down position.
Figure 3:
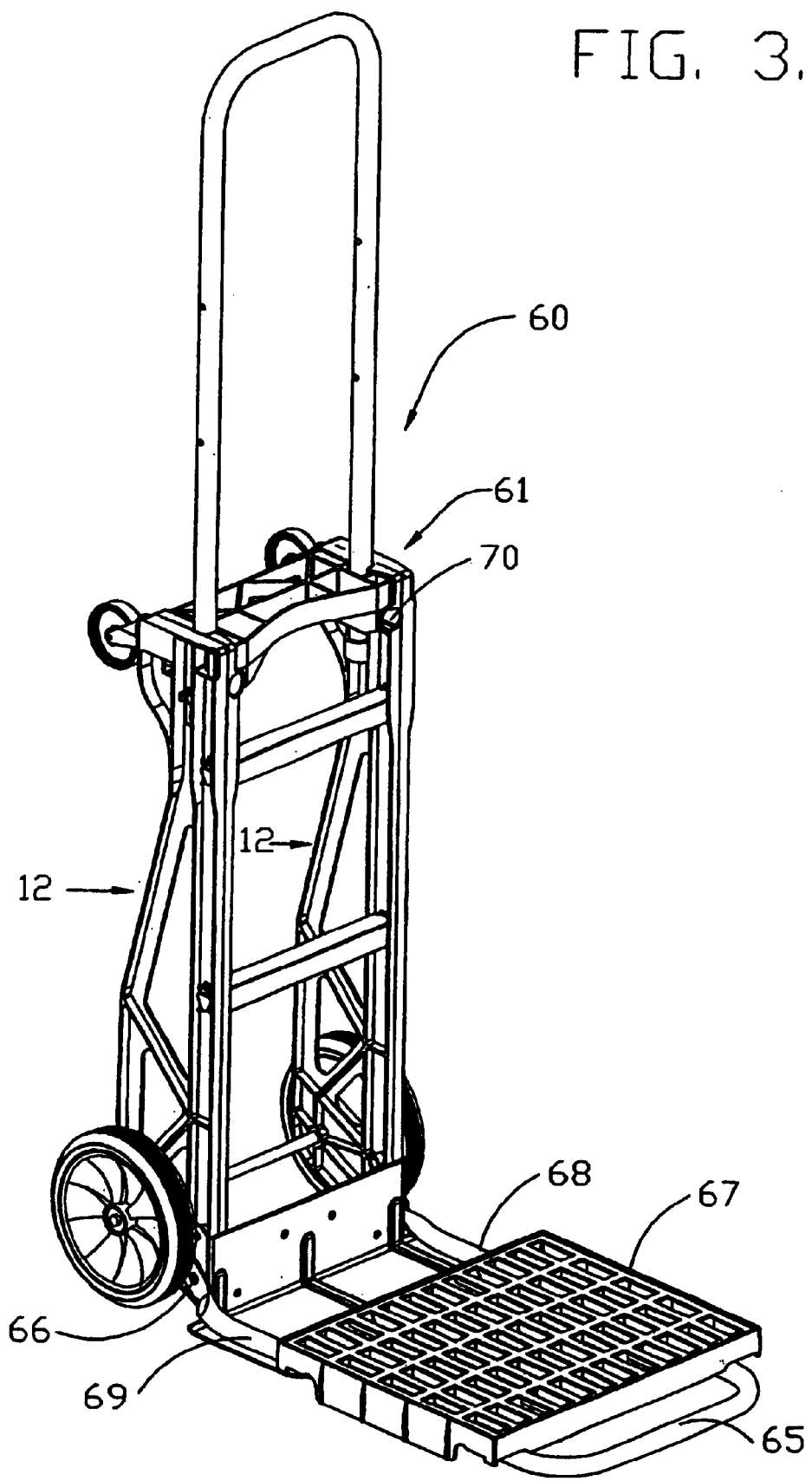
FIG. 3 is a perspective view of the multipurpose cart assembled in the hand truck configuration according to FIGS. 1 and 2 having a shelf operatively attached to the nose extension shown in FIG. 2.

FIG. 1 shows a preferred embodiment of the present invention comprising a multipurpose cart 60 having a base portion 61 previously explained in the incorporated references. In addition, the base portion 61 has caster wheels 62 that are operatively attached to side frames 12 via a mounting bracket 63. The caster wheels 62 are available in various sizes, configurations and types. When the multipurpose cart 60 is placed in a horizontal position, as shown in FIGS. 4–8, the caster wheels 62 and the mounting bracket 63 are designed to keep compression members 34 approximately horizontal relative to the ground or resting surface. It is obvious to those skilled in the art that in alternative embodiments, the caster wheels 62 need not be caster wheels and can be different types of wheels, such as non-pivoting, axle mounted or other known types of wheels. A handle 18 having handle extensions 19, 21 is mounted substantially parallel with respect to the compression members 34, as shown in FIGS. 1–3, or transverse to the compression members 34, as shown in FIGS. 4–9. The handle 18 can be operatively mounted in either of these two positions, each position being 90 degrees apart from the other, or the handle 18 can be removed. The handle 18 is adjustable in length in a first position, which is substantially parallel to the compression members 34, as shown in FIG. 1. The handle 18 has holes 64 for receiving locking pins (not shown) to hold the handle 18 at a desired length, as shown in FIG. 2. There are numerous locking pins that can be utilized. FIG. 1 shows a lifting platform 81 and a nose extension 65 operatively attached to the base portion 61. In the preferred embodiment, the nose extension 65 is a "U" shaped piece of tubing, and the nose extension 65 is operatively attached to the base portion 61 with bolts 66, nuts (not shown) and washers (not shown) at ends of lower extensions 68, 69 of the nose extension 65. The nose extension 65 is shown in the "up" or "folded-in" position. The nose extension 65 may be secured to the base portion 61 of the multipurpose cart 60 in the "up" position with fastening means (not shown). The fastening means can be a VELCRO® strip, clip or other device. VELCRO® is the federal trademark registration of Velcro Industries B.V., Castorweg 22–24, Curacao, Netherlands. In FIG. 1, the multipurpose cart 60 is shown in a hand truck configuration and is used for transporting loads. The use of a hand truck is well-known and no further explanation is required.

Turning now to FIG. 2, the multipurpose cart 60 is shown with the nose extension 65 in the "down" or "extended" position. The multipurpose cart 60 having the nose extension 65 in the down position is able to carry longer or wider loads because of the nose extension 65. For example, bags of cement, large bags of dog food, large bags of bark mulch, medium to large boxes and other similar loads not easily transported by the standard hand truck are easily lifted and transported by the multipurpose cart 60 in this configuration. In this configuration, the multipurpose cart 60 is used in much the same way as the hand truck, but with the ability to handle larger, wider and/or awkward loads.

FIG. 3 shows the multipurpose cart 60 according to FIG. 2, having a shelf 67 operatively attached to the nose extension 65. In this preferred embodiment, shown in FIG. 3, the shelf 67 has grooves 80 for receiving the handle 18 and the lower extensions 68, 69. In alternative embodiments, the shelf 67 snaps into place. In this particular configuration, the multipurpose cart 60 can carry loads that may not be suitably carried and transported on just the lifting platform 81 or the nose extension 65. For example, if the lifting platform 81 is too short for lifting loads, if the load could fall through the lower extensions 68, 69 of the nose extension 65, or if additional support is required to hold the load, the addition of the shelf 67 to this preferred embodiment will allow for transportation of the load nonetheless.

Figure 4:
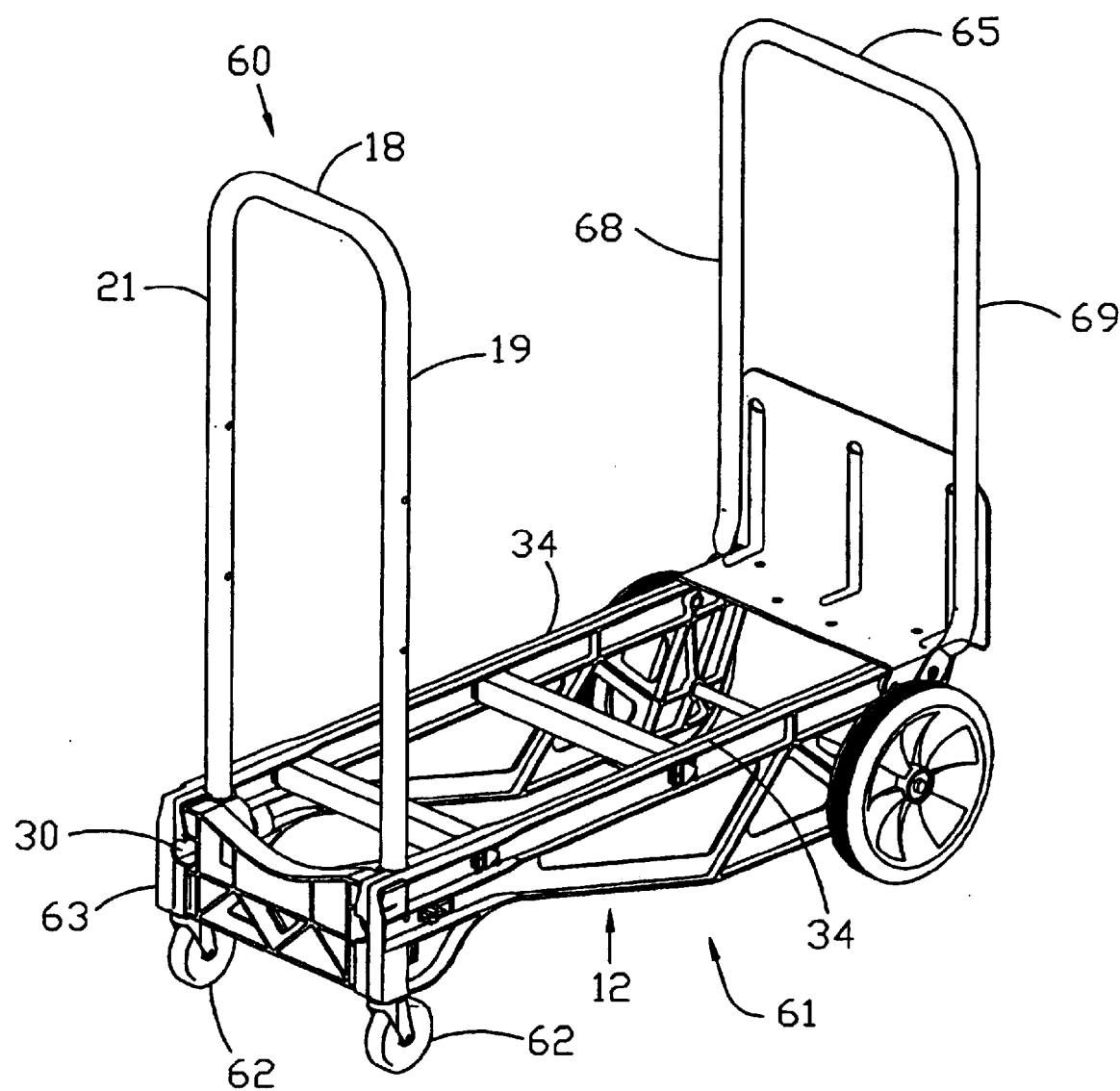
FIG. 4 is a perspective view of the multipurpose cart according to FIG. 2 but in a horizontal position and having the handle in a vertical position.

FIG. 4 shows the multipurpose cart 60 in a horizontal position, wherein the compression members 34 are approximately horizontal to, or parallel with, the ground or resting surface. To change the configuration of the multipurpose cart 60 from that shown in FIG. 2 to that which is shown in FIG. 4, the multipurpose cart 60 is placed in the horizontal position and the locking pins are removed. Thereafter, the handle 18 is then removed from sockets 30. The handle 18 is then placed into alternative sockets 70, best shown in FIGS. 1–3, and locked into place by the locking pins. In the configuration shown in FIG. 4, the multipurpose cart 60 is a movable wood rack. Instead of carrying wood to the wood rack, the multipurpose cart 60 allows the wood rack to be moved to the wood pile. Additionally, the multipurpose cart 60 may be used to advantageously transport large loads or store large loads thereon. There are many other ways the multipurpose cart 60 may be used in this configuration and the aforementioned use are merely examples of use, and are not intended to be limiting. After the multipurpose cart 60 is loaded, the user moves the multipurpose cart 60 by pushing on the handle 18.

Figure 5:
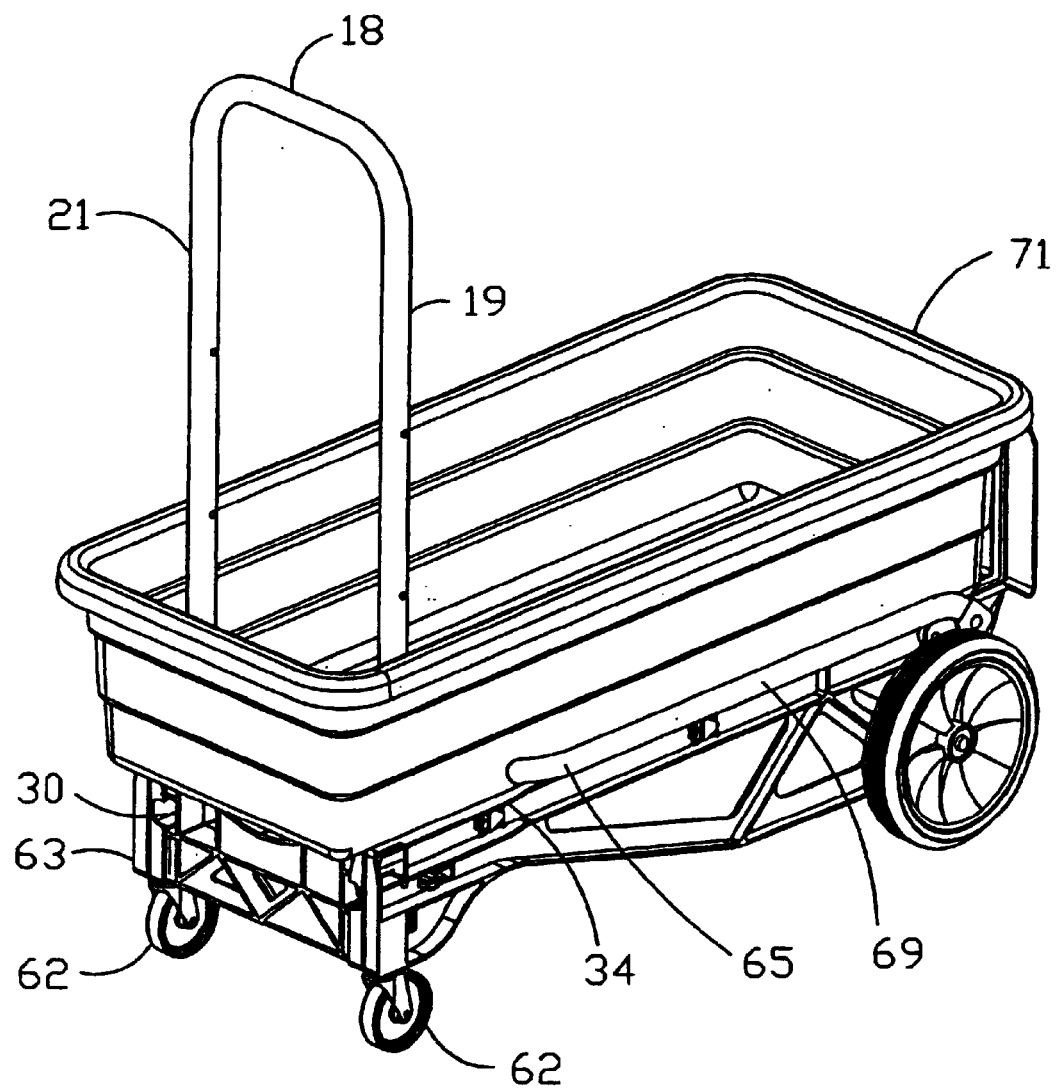
FIG. 5 is a perspective view of the multipurpose cart according to FIG. 4 with the nose extension against the frame and having a tub.

FIG. 5 shows the multipurpose cart 60 in a wheel barrow configuration. To change the configuration from that shown in FIG. 4 to that shown in FIG. 5, the nose extension 65 is pushed down toward the compression members 34, and a tub 71 is placed onto the compression members 34 and the nose extension 65. The nose extension 65 provides a cradle surface for the tub 71 and prevents the tub 71 from moving side to side. A cutout (not shown) is provided so that the handle 18 can slip through the tub 71 and support same. Once the tub 71 is assembled, the multipurpose cart 60 may be used like a wheel barrow. The tub 71 may advantageously be designed to hold all parts of the multipurpose cart 60 in a cavity 82 of the tub 71, thus allowing the multipurpose cart 60 to be shipped and stored in the tub 71.

Figure 6:
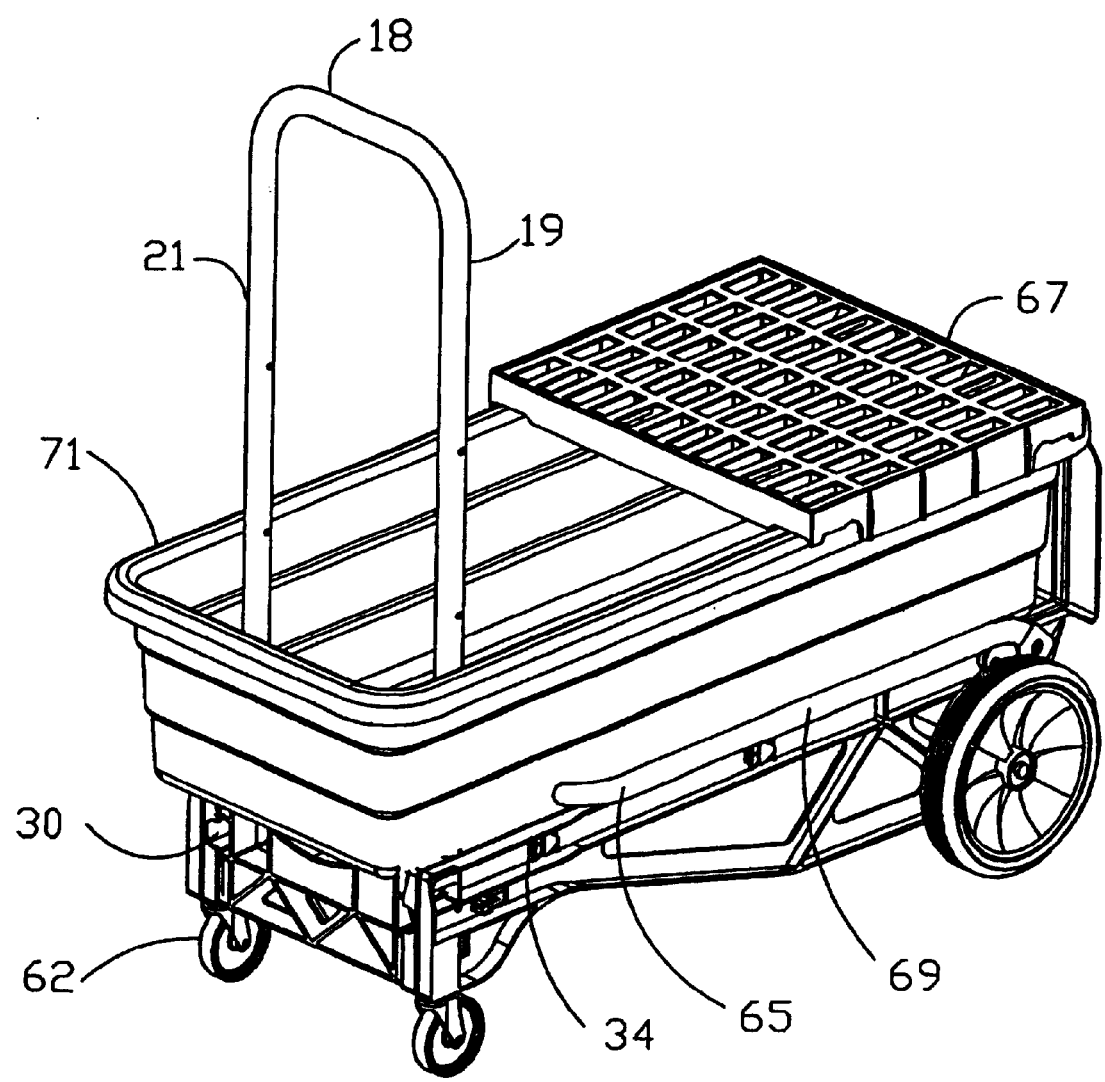
FIG. 6 is a perspective view of the multipurpose cart according to FIG. 5 having a seat or shelf platform operatively attached to the tub.

FIG. 6 shows the multipurpose cart 60 according to FIG. 5, but with the shelf 67 operatively mounted to the tub 71, wherein the shelf 67 has grooves 80, which stabilize the shelf 67 when placed onto the tub 71. In this configuration, the multipurpose cart 60 is a seated wheel barrow, gardening device or wagon, wherein a gardener may sit on the shelf 67 and use the tub 71 for holding soil, plants, flowers, tools, etc. The multipurpose cart 60 may also be used by mechanics or autobody mechanics for working on various tasks such as, for example, fixing the brakes of a vehicle. During use of the multipurpose cart 60, the mechanic may sit on the shelf 67 and place his or her tools and brake parts in the tub 71 for easy and convenient access. Autobody mechanics may also use the multipurpose cart 60 in much the same way while performing various tasks, such as sanding, puttying or painting a vehicle. In yet another use, the user may use the multipurpose cart 60 while washing a car, especially while washing the hub caps and white walls on the tires of the car.

Figure 7:
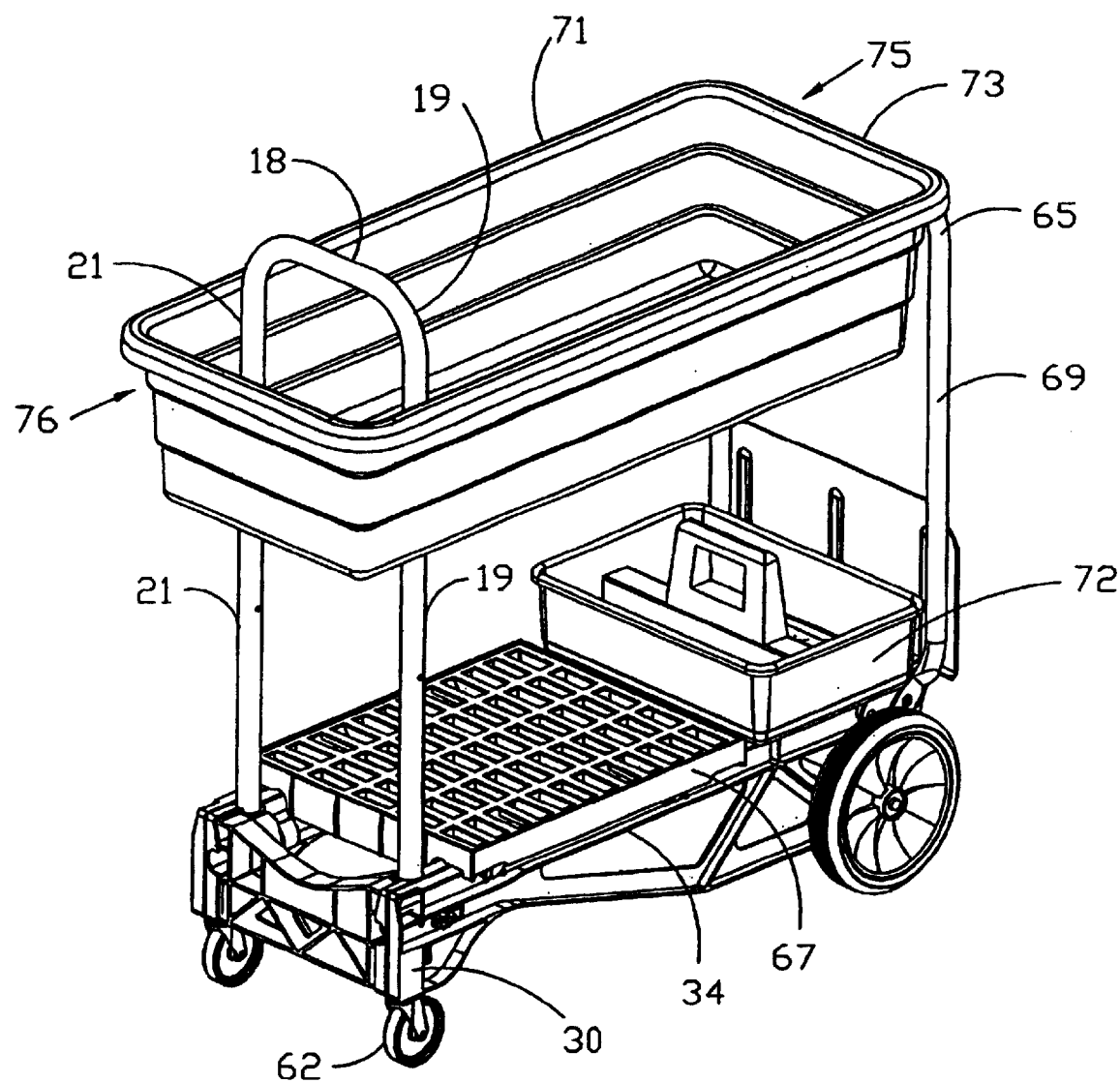
FIG. 7 is a perspective view of the multipurpose cart according to FIG. 4 having a tub, shelf and storage device operatively attached thereto.

FIG. 7 shows the multipurpose cart 60 in a garden or utility configuration. In this configuration, the handle 18 slips through the cutout of the tub 71. The tub 71 has a lip 73, wherein the lip 73 rests on the nose extension 65 at a first end 75. The lip 73 supports the tub 71 on the first end 75, and the handle 18 and hitch pins (not shown) support the tub 71 in a raised position at a second end 76. The hitch pins are placed through the holes 64 of the handle extensions 19, 21, and the tub 71 rests on the hitch pins. The tub 71 remains in the raised position and is approximately parallel to the compression members 34 because of the hitch pins and the lip 73. The hitch pins are not meant to be limiting and can be straight pins, cotter pins or other similar devices. A storage device 72 and the shelf 67 rest on the compression members 34. This configuration may be used as, for example, a work station, mechanics cart, tool cart, grocery cart, planter stand or garden cart. The storage device 72 can be used for various purposes, such as holding tools, gardening supplies and other items.

Figure 8:
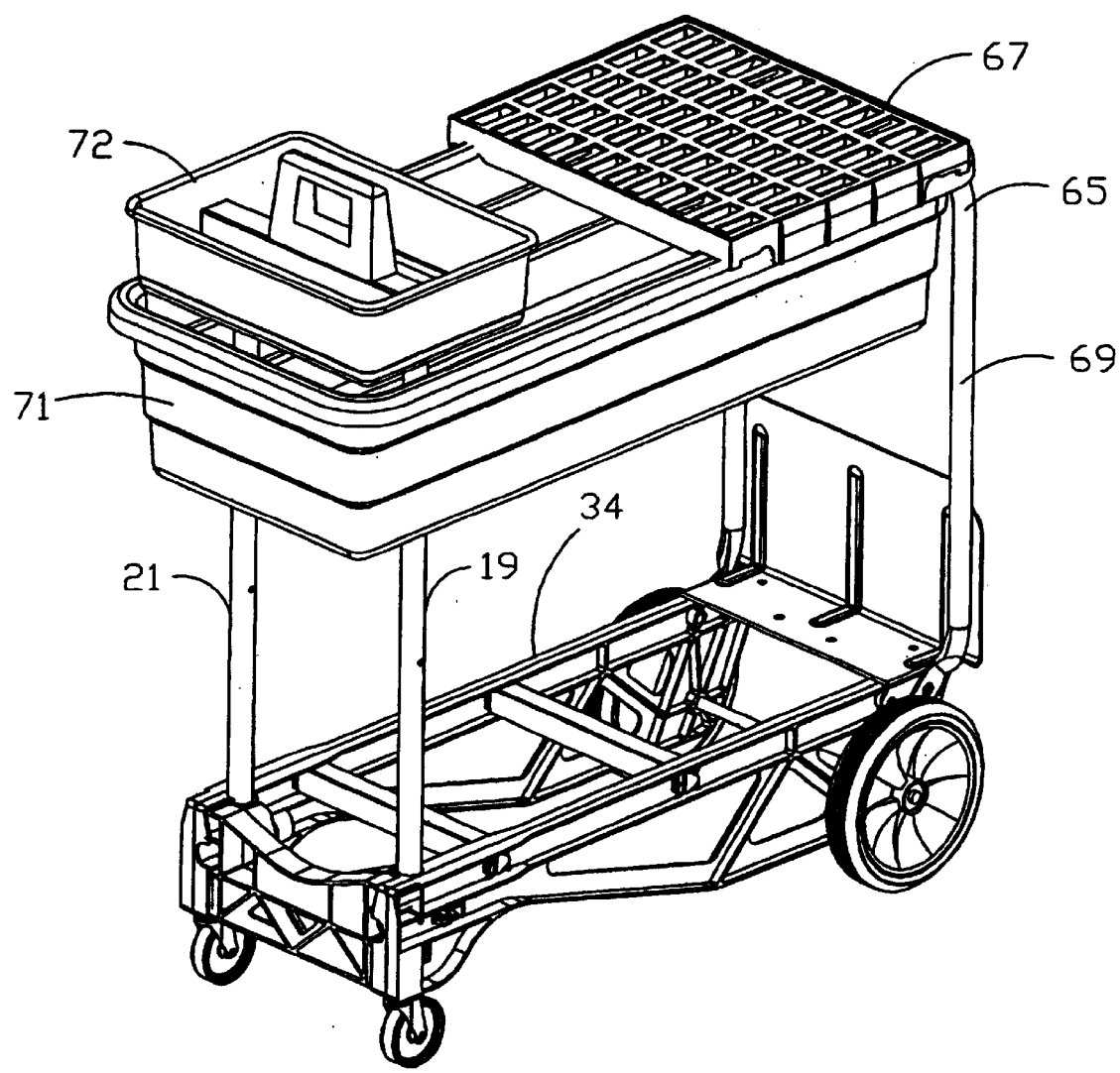
FIG. 8 is a perspective view of the multipurpose cart according to FIG. 7 but with the shelf and the storage device in a different position.

FIG. 8 shows the multipurpose cart 60 according to FIG. 7, but with the shelf 67 mounted on the tub 71 and the storage device 72 mounted on the handle 18. The shelf 67 has grooves 80 so that when placed onto the tub 71, it provides a stable surface. The storage device 72 has a recess for receiving the handle 18, wherein the storage device 72 is supported by the handle 18. The multipurpose cart 60 in this configuration may be used as a work station, mechanics cart, tool cart, grocery cart, planter stand or garden cart. When used as a mechanics cart or tool cart, the compression members 34 may advantageously be used for supporting tool boxes, etc.

Figure 9:
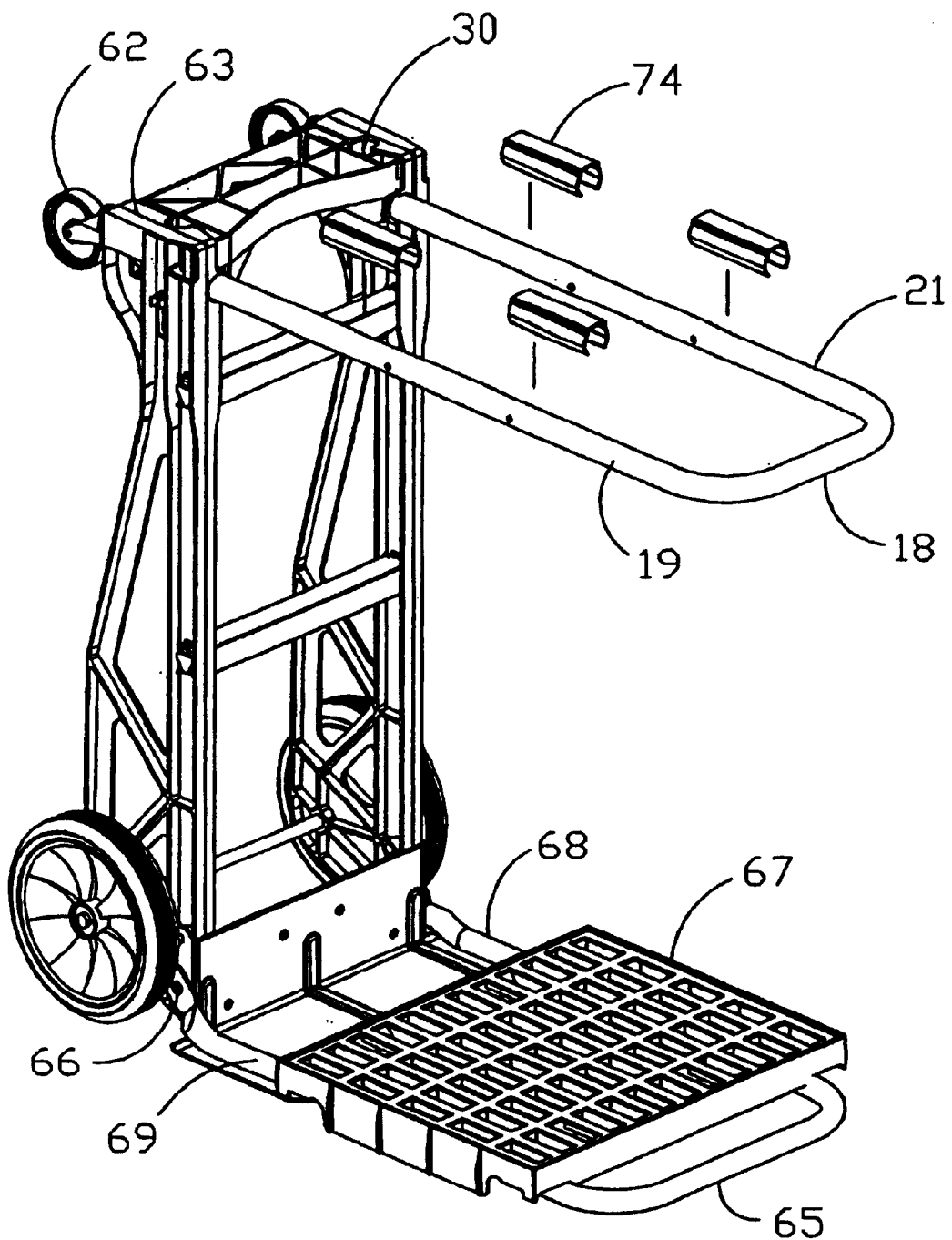
FIG. 9 is a perspective view of the multipurpose cart according to FIG. 3 but with the handle in a horizontal position and having bag clips for holding a bag.

FIG. 9 shows the multipurpose cart 60 in FIG. 3 but with the handle 18 in a different position. To change the configuration from that shown in FIG. 3 to that shown in FIG. 9, the handle 18 is removed from the sockets 30 and operatively mounted to the alternative sockets 70, wherein the locking pins hold the handle 18 in place. In this configuration, the multipurpose cart 60 may be used, for example, as a trash bag holder, which is useful when doing yard work. Clips 74 are provided to hold the trash bag in place during loading. In use, the trash bag is placed between the handle extensions 19, 21 and the handle 18, and open ends of the trash bag are wrapped at least partially around the handle extensions 19, 21 and the handle 18. The clips 74 are then used to clip down on the handle extensions 19, 21 and the handle 18, thereby holding the trash bag in the open position. The clips 74 are "U" shaped, having an opening 83 for receiving the handle extensions 19, 21 and the handle 18. The opening 83 is slightly smaller than the handle extensions 19, 21 and the outside diameters of handle 18. When the clips 74 are placed over the trash bag and the handle extensions 19, 21 and handle 18, the opening 83 expands and clamps down on the trash bag. Obviously, other bags could be used besides trash bags, but for explanation or illustration purposes, the trash bag was used as an example.

Figure 10:
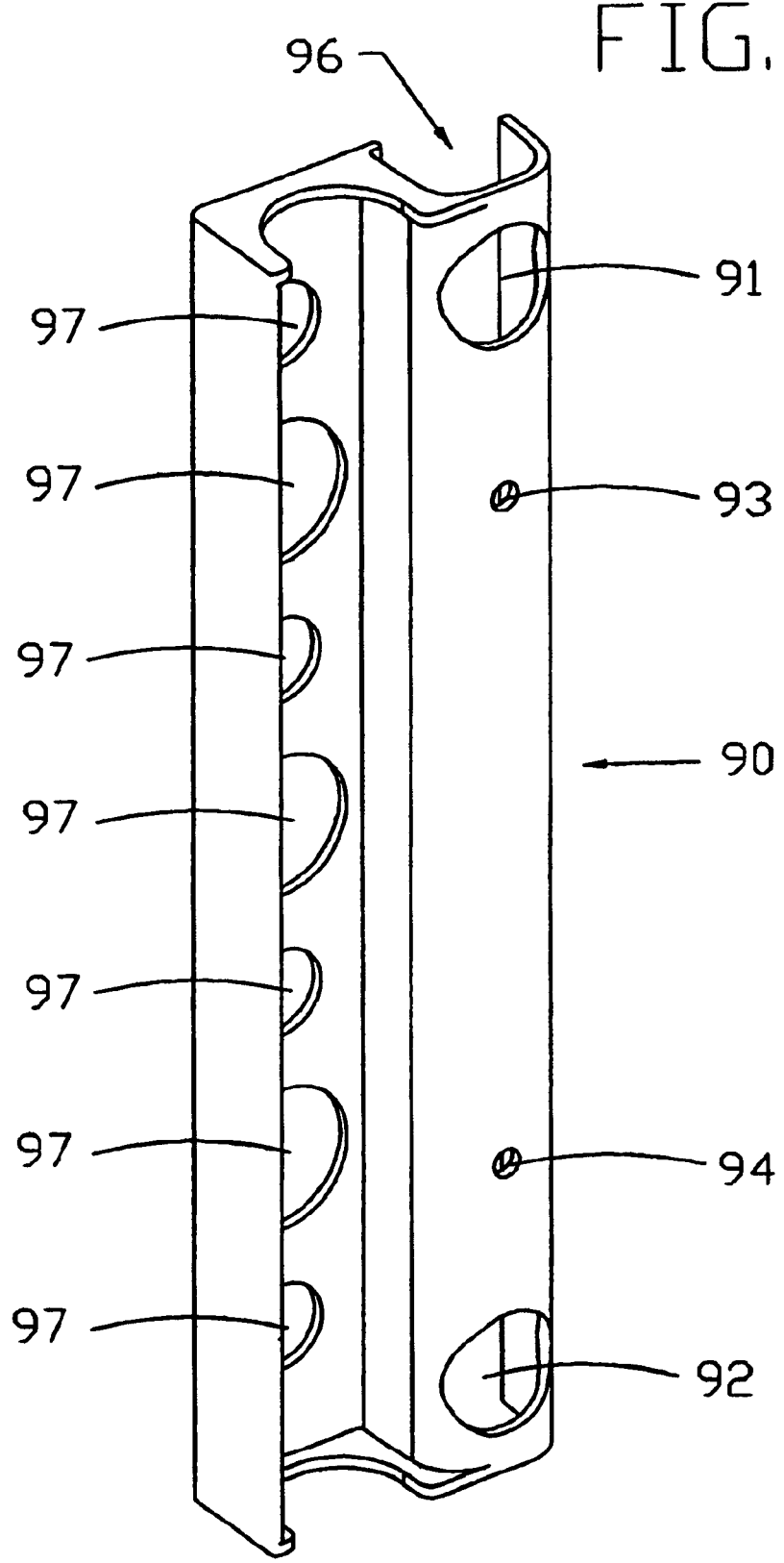
FIG. 10 is a perspective view of a tool tray for use with the multipurpose cart.

FIG. 10 shows a tool tray 90 for use with the multipurpose cart 60. The tool tray 90 has two handle holes 91, 92 for receiving the handle extensions 19, 21 of the handle 18. The tool tray 90 has two fastening holes 93, 94 used for receiving fastening devices (not shown), such as, but not limited to, screws. The fastening devices have heads larger in diameter than the two fastening holes 93, 94 and shafts smaller in diameter than the two fastening holes 93, 94. The fastening devices in the form of screws are placed through the two fastening holes 93, 94 and screwed or secured to the multipurpose cart 60 or the tub 71. When used on the tub 71, the tool tray 90 does not receive the handle extensions 19, 21 of the handle 18. Instead, the tool tray 90 clips to the tub 71. The tool tray 90 has a "U" shaped portion 96 for receiving the lip 73 of the tub 71. The tool tray 90 has a plurality of tool holes 97 for receiving and holding handles of tools.

Figure 11:
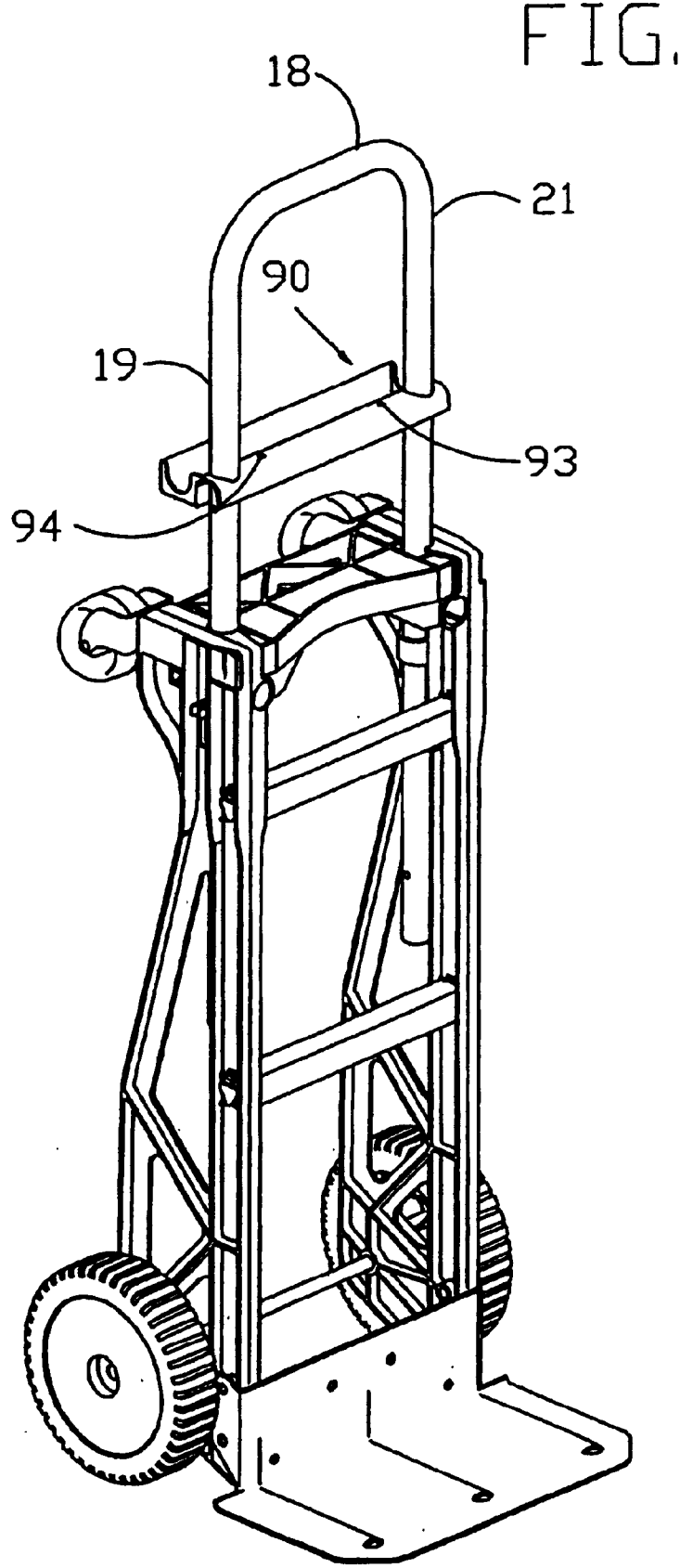
FIG. 11 is a perspective view of the multipurpose cart according to FIG. 1 having the tool tray attached thereto.

FIG. 11 shows the multipurpose cart 60 according to FIG. 1 having the tool tray 90 partially attached thereto. To assemble the tool tray 90, the handle 18 is removed and placed through the handle holes 91, 92 of the tool tray 90 and into the sockets 30. Thereafter, the fastening devices are placed into the fastening holes 93, 94 and secured to the multipurpose cart 60.

Figure 12:
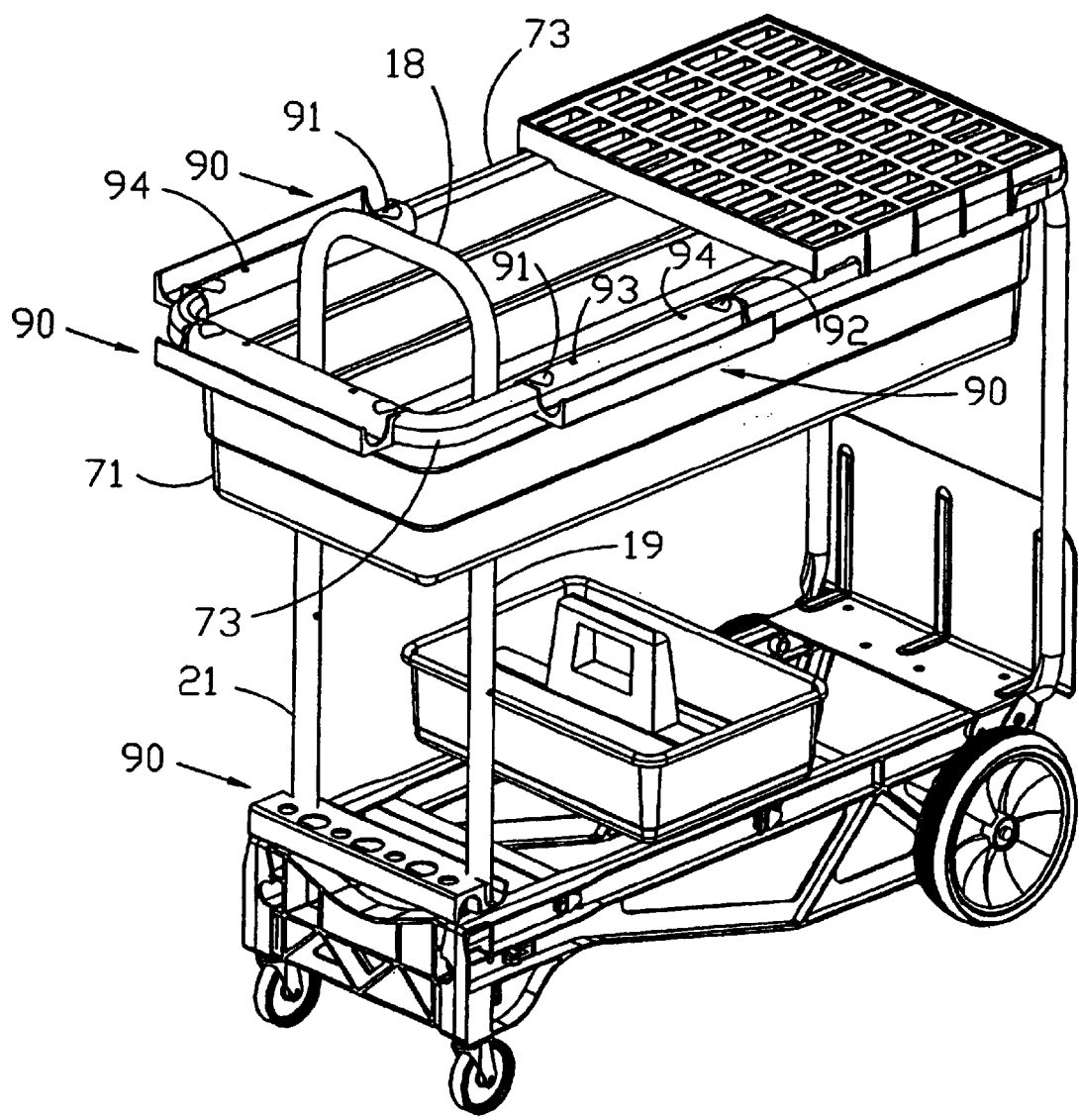
FIG. 12 is a perspective view of the multipurpose cart according to FIG. 8 having multiple tool trays attached thereto.

FIG. 12 shows the multipurpose cart 60 according to FIG. 8 having a plurality of the tool trays 90 attached to the lip 73 of the tub 71 and the handle 18. To assemble the tool tray 90 to the handle 18, the handle 18 is removed and placed through the handle holes 91, 92 of the tool tray 90 and into the alternative sockets 70. Thereafter, the fastening devices are placed into the fastening holes 93, 94 and secured to the multipurpose cart 60. To assemble the tool tray 90 to the lip 73 of the tub 71, the "U" shaped portion 96 of the tool tray 90 clips to the lip 73. Thereafter, the fastening devices are placed into the fastening holes 93, 94 and secured to the multipurpose cart 60. To use the tool tray 90, the handles of tools are placed through the tool holes 97. The heads of the tools hold the tools on the tool tray 90.

It is important to note that assembly into any one of the configurations shown in FIGS. 1–9 and 11–12 is easily done from any of the disclosed configurations, and vice versa, and no further explanation is required.

Other objects, features and advantages will be apparent to those skilled in the art. While preferred embodiments of the present invention have been illustrated and described, this has been by way of illustration and the invention should not be limited except as required by the scope of the appended claims.

What is claimed is:

1. A multipurpose cart having a pair of side frames joined by a handle at their upper ends, said side frames also being joined by cross rails along the length of said side frames; a lifting platform for supporting a lifted load, said lifting platform joining lower ends of said side frames; an axle with a pair of wheels attached to said lower ends of said side frames; and mounting brackets operatively attached to said upper ends of said side frames for receiving a pair of caster wheels, the improvement comprising:

a nose extension operatively attached to said lower ends of said side frames having a first position for receiving said lifted load and a second position for allowing said lifting platform to be used for supporting said lifted load;

wherein, during operation, said wheels and said caster wheels contact a surface, said nose extension is in said second position and said handle is removably attached to alternative sockets extending substantially perpendicular with said nose extension; and a tub, removably and operatively mounted on said nose extension and compression members of said side frames, wherein said handle extends from said alternative sockets and through said tub.

2. The multipurpose cart according to claim 1, further including a shelf removably mounted on said tub.

3. A multipurpose cart having a pair of side frames joined by a handle at their upper ends, said side frames also being joined by cross rails along the length of said side frames; a lifting platform for supporting a lifted load, said lifting platform joining lower ends of said side frames; an axle with a pair of wheels attached to said lower ends of said side frames; and mounting brackets operatively attached to said upper ends of said side frames for receiving a pair of caster wheels, the improvement comprising:

a nose extension operatively attached to said lower ends of said side frames having a first position for receiving said lifted load and a second position for allowing said lifting platform to be used for supporting said lifted load;

wherein during operation, said wheels and said caster wheels contact a surface, said nose extension is in said first position and said handle is removably attached to alternative sockets extending substantially parallel with said nose extension;

a tub having first and second ends and a lip at the first end, the first end of the tub being removably mounted on said nose extension, wherein said lip is engaged with said nose extension; and pins operatively attached to said handle for supporting said tub at its second end.

4. The multipurpose cart according to claim 3, further including a shelf and a storage device removably mounted on compression members of said side frames below said tub.

5. The multipurpose cart according to claim 3, further including a shelf and a storage device removably mounted to said tub.

6. The multipurpose cart according to claim 3, further including a tool tray for holding tools.

7. A multipurpose cart having a pair of side frames joined by a handle at their upper ends, said side frames also being joined by cross rails along the length of said side frames; a lifting platform for supporting a lifted load, said lifting platform joining lower ends of said side frames; an axle with a pair of main wheels attached to said lower ends of said side frames; mounting brackets operatively attached to said upper ends of said side frames for receiving a pair of caster wheels; and a nose extension operatively attached to said lower ends of said side frames having a first position for receiving said lifted load and a second position for allowing said lifting platform to be used for supporting said lifted load;

wherein said multipurpose cart may be operated alternately in a first working position and a second working position, wherein during operation in said first working position:

said main wheels contact a surface and the side frames are in a generally upright position; and said multipurpose cart further comprises:

a removable shelf mounted on said nose extension in said first position;

alternative sockets at the upper ends of said side frames for receiving said handle, the alternative sockets being arranged so that, when said handle is inserted therein, the handle extends at about a right angle to the side frames; and a plurality of securing clips which clamp on said handle for holding a bag in an open position; and during operation in said second working position:

said main wheels and caster wheels contact a surface;

said handle is removably attached to the alternative sockets, both the handle and nose extension being in a generally upright position; and said multipurpose cart further includes a tub which has first and second ends, and a lip at said first end that is engaged with said nose extension; and said multipurpose cart also including pins operatively attached to said handle for supporting said tub at its second end.

8. The multipurpose cart according to claim 7, further including a shelf and a storage device removably mounted on compression members of said side frames and below said tub.

9. The multipurpose cart according to claim 7, further including a shelf and storage device removably mounted on said tub.

10. A multipurpose cart including:

an elongated tub having first and second ends;

a pair of side frames joined by a handle at their upper ends, said side frames also being joined by cross rails along the length of said side frames;

a lifting platform for supporting a lifted load, said lifting platform joining lower ends of said side frames;

an axle with a pair of wheels attached to said lower ends of said side frames;

mounting brackets operatively attached to said upper ends of said side frames for receiving a pair of caster wheels;

apparatus including said handle for supporting the elongated tub at the first end; and a nose extension operatively attached to said lower ends of said side frames for supporting the elongated tub at its second end.

11. A multipurpose cart according to claim 10, further including:

a shelf sized for mounting on the elongated tub;

clips for clamping on said handle; and a storage device for mounting on the multipurpose cart.

12. A multipurpose cart according to claim 10, further including a tool tray for holding tools.

13. A multipurpose cart according to claim 10, including means for pivotally mounting the nose extension to said lower ends of said side frames; and wherein the nose extension is moveable between a first position adjacent the side frames to a second position at about a right angle to the first position for supporting the second end of the elongated tub at the second position.

14. A multipurpose cart according to claim 13, wherein the elongated tub is removably mounted, the handle is moveable from the position supporting the first end of the elongated tub to another position at about a right angle thereto and extending outwardly from the side frames; whereby the cart is operable as a hand truck.

15. A multipurpose cart according to claim 13, wherein the elongated tub is removably mounted.

16. A multipurpose cart including a pair of side frames having upper and lower ends; first and alternative socket means at the upper ends, a handle at the upper ends and selectively mounted in one of the socket means; support means at the lower end of the side frames for supporting a lifted load; an axle with a pair of wheels attached to the lower ends of the side frames; a tub having first and second ends; the tub, when the side frames are in a lowered position adjacent the ground, being removably mounted on the support means; and wherein the handle extends from the alternative socket means and through the tub adjacent one of its ends to support the tub.

17. A multipurpose cart according to claim 16, wherein the support means comprises a nose extension pivotably mounted at the lower ends of the side frames for movement between a first position adjacent the side frames and a second position extending outwardly from the side frames at about a right angle thereto; and wherein the nose extension, when in the first position, is operative to engage the tub and restrain movement thereof.

18. A multipurpose cart according to claim 17, wherein the tub has a peripheral rim; wherein the nose extension, when in the second position, engages the rim at the other of said ends of the tub to support the tub in a position spaced from the side frames; and including means operatively attached to the handle for further supporting the tub in the position spaced from the side frames.

19. A multipurpose cart according to claim 17, including a shelf selectively mountable on the nose extension, the side frames, or the tub.

20. A multipurpose cart according to claim 16, wherein the handle is adjustably mounted in the first socket means for movement between multiple positions generally parallel to the side frames.

21. A multipurpose cart according to claim 17, including a storage device selectively mountable on the handle.

\* \* \* \* \*